May 2, 1939.  E. A. BECKWITH  2,156,716
CORN GRADER
Filed April 4, 1936  4 Sheets-Sheet 1

Earl A. Beckwith, INVENTOR
BY Victor J. Evans & Co.
ATTORNEY

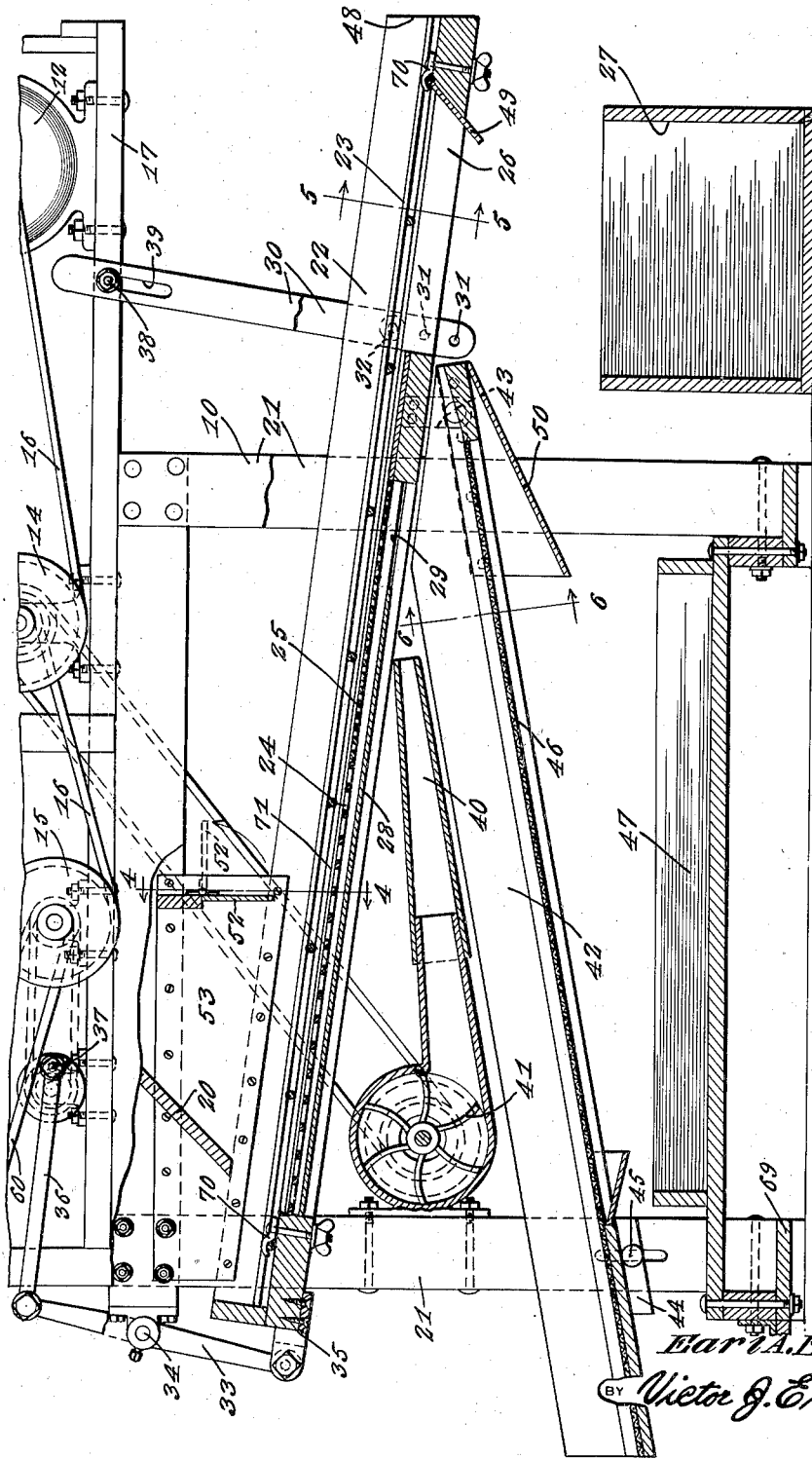

May 2, 1939.　　　E. A. BECKWITH　　　2,156,716
CORN GRADER
Filed April 4, 1936　　　4 Sheets-Sheet 3
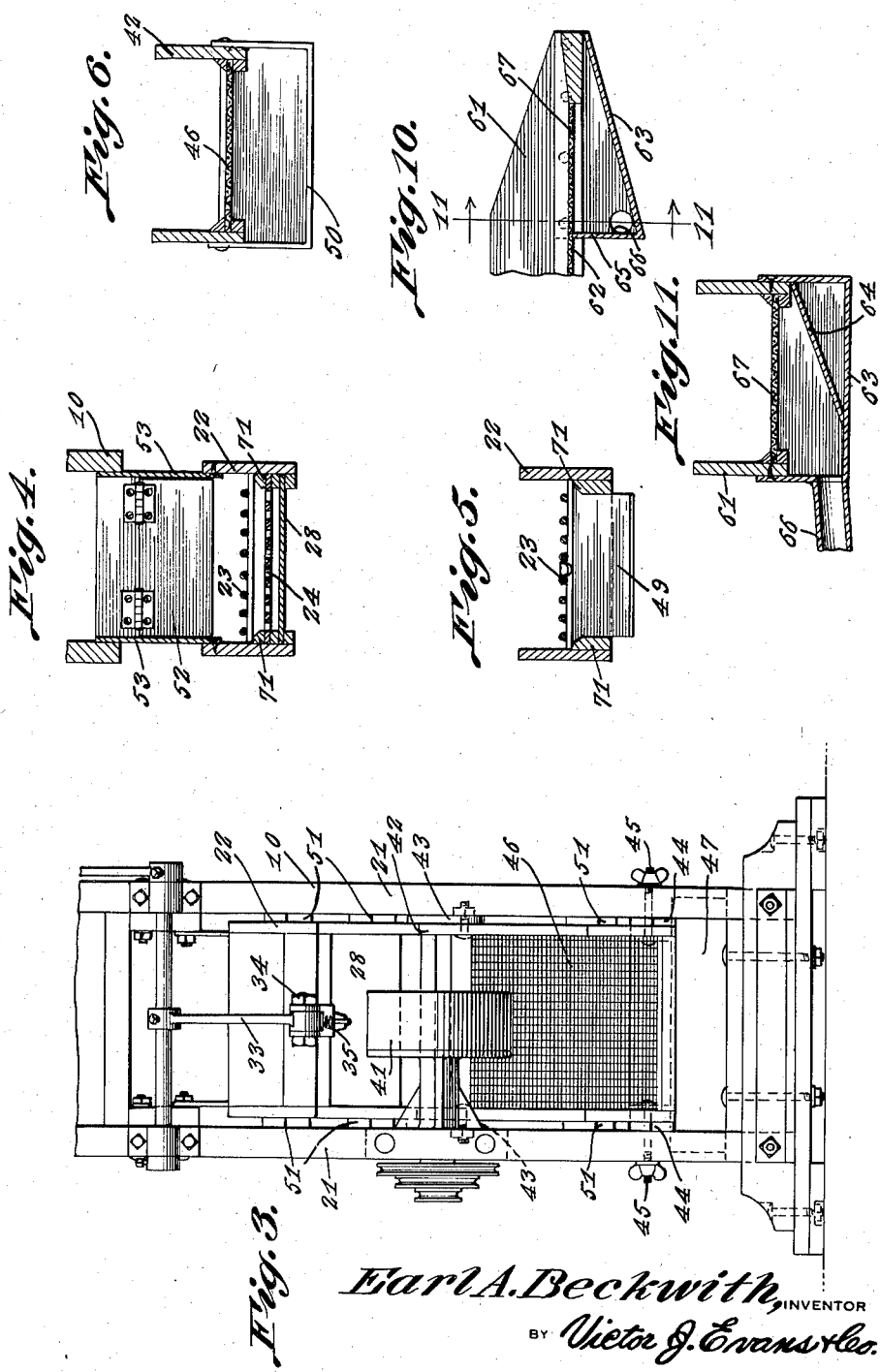

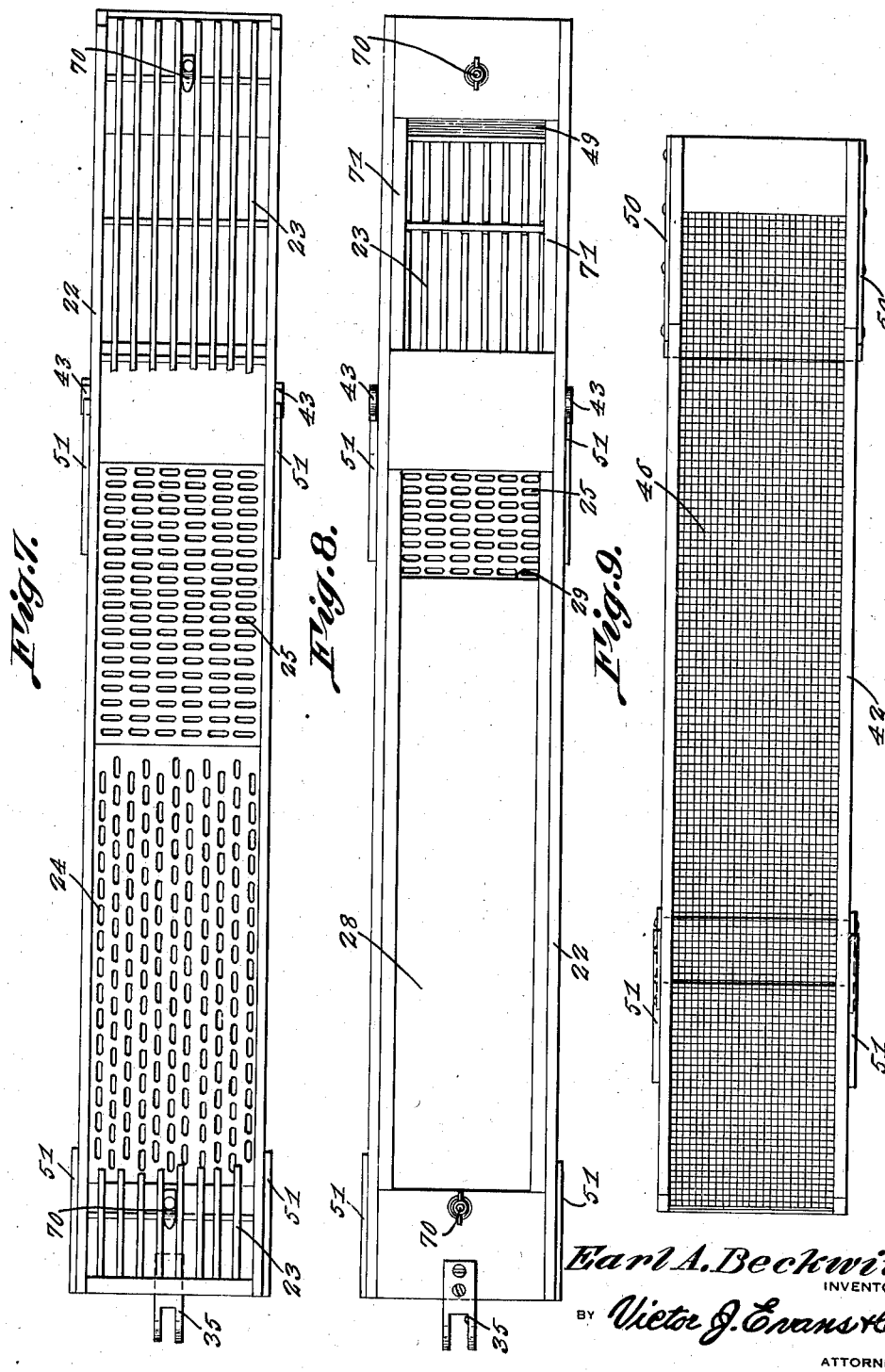

Patented May 2, 1939

2,156,716

UNITED STATES PATENT OFFICE 2,156,716

CORN GRADER

Earl A. Beckwith, Ludlowville, N. Y.

Application April 4, 1936, Serial No. 72,793

3 Claims. (Cl. 209—315)

The invention relates to a combination corn sheller and grading machine and more especially to an apparatus or machine for shelling, grading and bagging corn.

The primary object of the invention is the provision of a machine or apparatus of this character, wherein corn on the ear or loose corn can be graded, that is, when the corn on the ear is shelled automatically by the machine and at the same time the shelled or loose corn will be cleaned during the grading operation of the machine or apparatus, the said machine being primarily intended for persons growing a small acreage of corn for seed purposes, wherein their working capital is limited and also floor space is restricted.

Another object of the invention is the provision of a machine or apparatus of this character, wherein the shelling and grading operations are carried forth successively in the working thereof and these operations are carried forth with perfection and with rapidity so that the working cost of the machine or apparatus is at a minimum.

A further object of the invention is the provision of a machine or apparatus of this character, which is comparatively simple in construction, thoroughly reliable and efficient in operation, and inexpensive to operate and manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 2 is a fragmentary vertical longitudinal sectional view through the machine.

Figure 3 is an end elevation thereof.

Figure 4 is a sectional view on the line 4—4 of Figure 2 looking in the direction of the arrows.

Figure 5 is a sectional view on the line 5—5 of Figure 2 looking in the direction of the arrows.

Figure 6 is a sectional view on the line 6—6 of Figure 2 looking in the direction of the arrows.

Figure 7 is a top plan view of one of the shaker tables employed in the machine.

Fig. 8 is a bottom plan view thereof.

Figure 9 is a top plan view of another of the shaker tables.

Figure 10 is a fragmentary vertical sectional view through a modified form of shaker table.

Figure 11 is a sectional view on the line 11—11 of Figure 10 looking in the direction of the arrows.

Similar reference characters indicate corresponding parts throughout the several views in the drawings.

Figure 1:
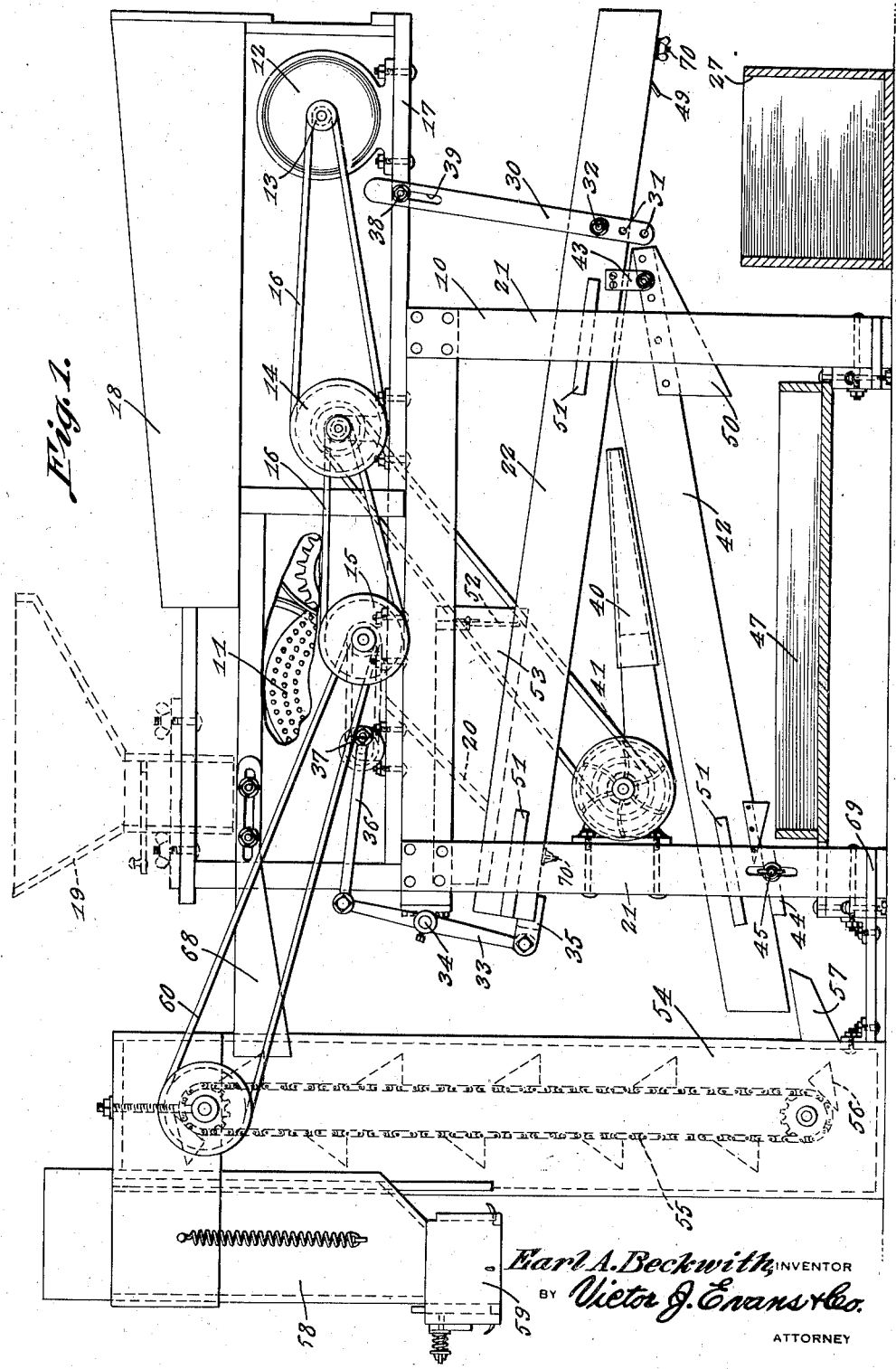
Figure 1 is a side elevation partly in section of a machine or apparatus constructed in accordance with the invention.

Referring to the drawings in detail, the machine or apparatus comprises a stand including a main frame 10 having at its top a corn shelling mechanism 11, which is of conventional kind and is driven from a motor 12, preferably of the electric type, the driving connections including pulleys 13, 14 and 15 having fitted therewith endless belts 16. This motor 12 in the present instance is supported upon a bed 17 built into the stand and elevated with respect to the corn shelling mechanism 11 is an ear corn feed trough or bin 18 which delivers the ears of corn to the said corn shelling mechanism 11 for the shelling of said ears when the machine or apparatus is operated. The stand also has built therein a loose corn feed hopper 19 which is located offset with respect to the shelling mechanism 11 so as to deliver loose corn therefrom against a baffle board 20, the latter being also arranged with respect to the corn shelling mechanism 11 to have the shelled corn therefrom fall upon said board 20 for gravitation of the same to a shaker table when the machine is operated.

Between the corner posts 21 of the stand 10 and beneath the bed 17 is an upper shaker table 22 having arranged at its bottom a cob screen 23 while beneath the latter are the coarse and fine screens 24 and 25, respectively, these being in the same plane with each other and extend for a major portion of the length of the shaker table 22 while the remaining portion of the length of the latter has provided therein a butt kernel discharge opening 26 for the delivery of butt kernels to a box 27 disposed beneath the said opening 26 and supported in any suitable manner. Beneath the screens 24 and 25 is a plate 28 having the opening 29 at one end thereof so that the screenings from the screens 24 and 25 can be discharged through this opening 29 and the said screens operate for grading shelled corn. The table 22 has inclined suspension thereof through the medium of hanger arms 30, these being arranged at opposite sides thereof and near their lower ends are provided with spaced holes 31 for selectively accommodating pivots 32 to that the said table can be variably inclined at will. This table 22 is reciprocated by a rocking lever 33 journaled at 34 to the frame and coupled with said table at 35, the lever being rocked by a pitman 36 actuated from an eccentric 37 having driving connection with the motor 12. The arms 30 are hung upon pivots 38 carried by the bed 17 and these pivots have play in slots 39 provided in said arms. The shelled corn is fed from the baffle board 20 onto the table 22 at the elevated end thereof and under shaking action of this table the said corn by the screens 24 and 25 will be graded when dispensed from the table.

Directed toward the opening 29 beneath the table 22 is a blower nozzle 40 of a blower 41 which is driven from the motor 12 so that air blown through the nozzle 40 will dispense chaff and foreign matter from the corn when being delivered from the table 22 after grading thereof.

Beneath the table 22 is a lower shaker table 42, it being reversely inclined with respect to the table 22 and is suspended at its elevated end by strap hangers 43 from the table 22. The lower end of this table 42 rests upon an adjustable block 44 arranged in the stand 10. This block 44 by the adjusting nuts 45 can be regulated to change the incline of the table 42 which reciprocatingly slides on said block.

The table 42 in its bottom has a screen 46 for separating broken or small kernels of corn into a catch pan or tray 47 stationarily fitted beneath the table 42 in the stand. The cobs after shelling thereof and received in the table 22 will be discharged through the open end 48 thereof. The opening 26 for the butt kernels has clamped in proper position therein a deflector 49 while the table 42 carries the deflector chutes 50 for the broken and small kernels of corn to assure positive delivery thereof into the tray 47 and in this manner eliminating waste or a spill to either side of the stand.

The sides of the tables 22 and 42 have externally thereon spacer strips 51 which play against the corner posts 21 of the stand 10 and eliminate any side displacement of these tables during the operation of the machine or apparatus.

Rearwardly of the baffle board 20 is a hinged gate 52 which when opened permits inspection of the upper end of the shaker table 22 and this gate is arranged between side aprons 53 for said baffle board 20, these aprons being carried by the stand 10 at opposite sides thereof and extend downwardly over the sides of the said table 22 for a distance of the length of the elevated end thereof.

Next to the lower end of the table 42 is arranged a vertical stack 54 having fitted therein an endless bucketed conveyor or elevator 55, the buckets 56 of which are adapted to receive the graded corn from an inlet boot 57 located next to the open discharge end of the said table 42 and these filled buckets 56 deliver their contents to a bag filling hopper 58 having at its discharge end a bag holder 59 so that the corn shelled and graded can be delivered into a bag (not shown) when carried by the holder 59. The conveyor or elevator 55 is driven from the motor 12 through the medium of the driven connections 60.

In Figures 10 and 11 of the drawings there is shown a slight modification in one of the shaker tables, wherein at the elevated end of this table 61 beneath the screen 62 is fitted a scoop 63 having the laterally inclined portions 64 and the closed inner end 65, respectively, while leading from one side of said scoop next to the lowermost portion of the inclination is a spout 66 and this screen is for the purpose of grading small grains, the inclined portion 64 causing the falling of the said grains which are useful for seed purposes in the direction of the spout 66 which discharges into a box or other receiver. The screen 62 allows fine and small weed seeds to fall through the same and be carried out to the spout 66 into the box or container. The screen 62 confronted by the scoop 63 is provided with small perforations 67 to permit the passing of the small weed seeds or fine grains from upon the screen into the scoop 63 for the subsequent discharge into a box or container (not shown).

The stack 54 has connection with the stand 10 at the top of the latter by an adjustable bracket 68 which serves for the tightening of the driven connection 60 when the occasion requires while the bottom of this stack has connection at 69 with the lower portion of the said stand 10 and in this manner the stack 54 is joined with the stand.

The cob screen 23 is removably fastened in the table 22 by bolt clamps 70. The screens 24 and 25 and the plate 28 are uniformly spaced from one another when in the table 22 and such screens and plate are removable when the occasion requires, the screen 23 being spaced from the screens 24 and 25 and is seated upon a ledge 71 provided in said table 22 and extended marginally of this screen.

What is claimed is:

1. A machine of the character described comprising a stand, reversely inclined upper and lower tables within said stand, fine and coarse grading screens removably fitted in the upper table, a cob screen arranged above the first-mentioned screens, clamps on the upper table and releasably securing the cob screen therein, a rocking lever on the stand at the higher end of the upper table and having operative connection with the latter, hanger arms on said stand remote from said lever, a pivot carried by the upper table and selectively adjustable in the said hanger arms, strap hangers on the upper table and connected with the lower table for holding one end thereof in its reversed inclined position with respect to the upper table, and rest blocks adjustably connected in the stand and slidably engaged by the lower table.

2. A machine of the character described comprising a stand, reversely inclined upper and lower tables within said stand, fine and coarse grading screens removably fitted in the upper table, a cob screen arranged above the first-mentioned screens, clamps on the upper table and releasably securing the cob screen therein, a rocking lever on the stand at the higher end of the upper table and having operative connection with the latter, hanger arms on said stand remote from said lever, a pivot carried by the upper table and selectively adjustable in the said hanger arms, strap hangers on the upper table and connected with the lower table for holding one end thereof in its reversed inclined position with respect to the upper table, rest blocks adjustably connected in the stand and slidably engaged by the lower table, and connections between the rocking lever and a power element for the operation of said lever.

3. A machine of the character described comprising a stand, reversely inclined upper and lower tables within said stand, fine and coarse grading screens removably fitted in the upper table, a cob screen arranged above the first-mentioned screens, clamps on the upper table and releasably securing the cob screen therein, a rocking lever on the stand at the higher end of the upper table and having operative connection with the latter, hanger arms on said stand remote from said lever, a pivot carried by the upper table and selectively adjustable in the said hanger arms, strap hangers on the upper table and connected with the lower table for holding one end thereof in its reversed inclined position with respect to the upper table, rest blocks adjustably connected in the stand and slidably engaged by the lower table, connections between the rocking lever and a power element for the operation of said lever, and blast means interposed between the tables and having a discharge directed toward the uppermost table at the screens therein.

EARL A. BECKWITH.